United States Patent
Aldrey et al.

(10) Patent No.: US 8,611,521 B2
(45) Date of Patent: Dec. 17, 2013

(54) SYSTEMS AND METHODS FOR MULTI-MEDIA CONTROL OF AUDIO CONFERENCING

(75) Inventors: Raul Aldrey, Brookline, MA (US); Diego Crespo, Boston, MA (US); Aravind Perumandia, Woburn, MA (US); Gaurav Kumar, Flower Mound, TX (US); Shamik Basu, Irving, TX (US)

(73) Assignee: Verizon Services Corp., Ashburn, VA (US)

( * ) Notice: Subject to any disclaimer, the term of this patent is extended or adjusted under 35 U.S.C. 154(b) by 1198 days.

(21) Appl. No.: 11/482,403

(22) Filed: Jul. 7, 2006

(65) Prior Publication Data
US 2008/0037751 A1 Feb. 14, 2008

(51) Int. Cl.
*H04M 3/42* (2006.01)

(52) U.S. Cl.
USPC .............................. 379/205.01; 379/204.01

(58) Field of Classification Search
USPC .............. 379/202.01, 205.01, 206.01, 204.01
See application file for complete search history.

(56) References Cited

U.S. PATENT DOCUMENTS

| | | | |
|---|---|---|---|
| 6,233,605 B1 * | 5/2001 | Watson | 709/204 |
| 7,617,280 B1 * | 11/2009 | Webster et al. | 709/204 |
| 2004/0218744 A1 * | 11/2004 | Nguyen et al. | 379/202.01 |
| 2005/0034079 A1 * | 2/2005 | Gunasekar et al. | 715/753 |
| 2005/0128283 A1 * | 6/2005 | Bulriss et al. | 348/14.1 |
| 2005/0152523 A1 * | 7/2005 | Fellenstein et al. | 379/202.01 |
| 2005/0213724 A1 * | 9/2005 | O'Brien et al. | 379/202.01 |
| 2005/0265534 A1 * | 12/2005 | White | 379/202.01 |
| 2006/0067499 A1 * | 3/2006 | Oliveira et al. | 379/202.01 |
| 2006/0077958 A1 * | 4/2006 | Mallya et al. | 370/352 |

* cited by examiner

*Primary Examiner* — Antim Shah (57) ABSTRACT

An exemplary method and system are described for providing an easy to use interface for establishing multi-media audio conference calls involving a leader and a plurality of participants. A web-based interface can be used by the leader for establishing, controlling, and providing information associated with the call. Participants can also access the web-site for receiving information associated with the call and receiving status information regarding the conference call. In one embodiment, an address organizer can be used to select participants by the leader and schedule an audio conference call with the recipients having the opportunity to accept, decline, or indicate an alternative telephone number at which they can be reached.

24 Claims, 5 Drawing Sheets

SYSTEMS AND METHODS FOR MULTI-MEDIA CONTROL OF AUDIO CONFERENCING

BACKGROUND INFORMATION

Audio telephonic conferencing services are well known and several variations are commonly available for use by both residential and business users. One of the simplest versions is known as three-way calling, and allows the originator of a call to add on a third party to an existing call. This process is typically initiated by the user initiating a 'hookflash', which is a temporary depression of the "hook-switch" on a telephone. The hook-switch is the switch on a telephone that when depressed, terminates an active call. Conversely, when the hook switch is lifted (e.g., removing the receiver), dial-tone is provided. For telephone lines provisioned with three-way calling service, the temporary depression of the hook-switch while a call is active is interpreted by the telephone central office (CO) as a request for three-way calling. The CO places the active call on hold and provides dial-tone to the user. The user can dial the telephone number of the third party to be joined to the call. Once the third party has answered, the user can then invoke a second 'hook-flash' and conference in the third party into the call. For proper operation, the depression of the hook-flash switch must be of a minimum duration, but not too long. Many users find this operation difficult to use and either depress to hook too short (which may not be recognized by the CO, or too long, resulting in the call being terminated).

Another form of audio conferencing is six-way audio conferencing capability. This variation is also CO-based, and operates similar to three-way calling, but allows up to four additional parties to be joined to an active call. Again, many users find the control of the conference via the hook switch even more difficult given that more participants may be involved.

Because of the difficultly in operating this feature, various other conferencing services have been developed, such as the 'meet-me' conference. In this embodiment, a multi-port conference bridge is reserved and callers are given an access telephone number and a PIN. This allows callers to dial into the bridge, provide their PIN as authorization, after which they are then connected to the conference bridge. No depression of the switch hook is required.

Other versions of conference calling have been developed in which a conference bridge controller initiates calls to a set of previously indicated telephone numbers, and automatically bridges in the participants.

All such versions provide limited control to the leader of the conference call. The leader is common nomenclature for the person originating the conference call. In some current versions, the leader is given limited additional control over the call. For example, in the aforementioned three-way calling services, if the leader disconnects, the conference call is terminated. Further, the leader can terminate the last person added. In contrast, the participants typically have very little control or information over a conference call they are involved with.

Many individuals find existing conference calling services difficult to use, or limited in their functionality. Therefore, systems and methods are needed for enhancing the control of audio conference services.

DETAILED DESCRIPTION OF PREFERRED EMBODIMENTS

The preferred embodiments of the present invention (as claimed) now will be described more fully hereinafter with reference to the accompanying drawings. The inventions as claimed may be embodied in many different forms and should not be construed as limited to the preferred embodiments set forth herein; rather, these embodiments are provided so that this disclosure will satisfy applicable legal requirements. Like numbers refer to like elements throughout.

I. Overview

The exemplary Integrated Audio Conference Service (IACS or IAC service), augments traditional audio conference calling services in various ways, including allowing greater control and management capabilities by the leader, as well as by the participants. The IAC System (or "system") is the infrastructure used to provide the service. The IAC service can be integrated with other forms of communication technologies, thereby enhancing management of audio conferencing.

The IAC service can be integrated with various non-audio based communications related to an audio conference call (ACC) involving either the leader or the participants (or both). The non-audio based communications may be sent prior to the establishment of the ACC, during the ACC, or after the ACC. The non-audio based communications may include information that conveys control or status information (collectively referred to as ACC management information) and potentially information intended for review of the users of the system.

ACC management information can involve various other forms of communication, many of which are message based. These include: email, web-based communication (e.g., such as involving sending HTML, XML messages or other messages), Short Message Service (SMS), as well as communication used by other application programs (e.g., contact/address management programs). Because web-based communication forms are very common, this form of ACC management information is used to illustrate the operation of various embodiments described herein, though other communication forms are not precluded as is well known.

ACC management information pertaining to a conference call can be categorized, for sake of illustration, as being associated with the establishment of the ACC, control of the ACC, and post-ACC aspects. For example, control information provided by the leader is one form of ACC management information, as well is status information.

Figure 1:
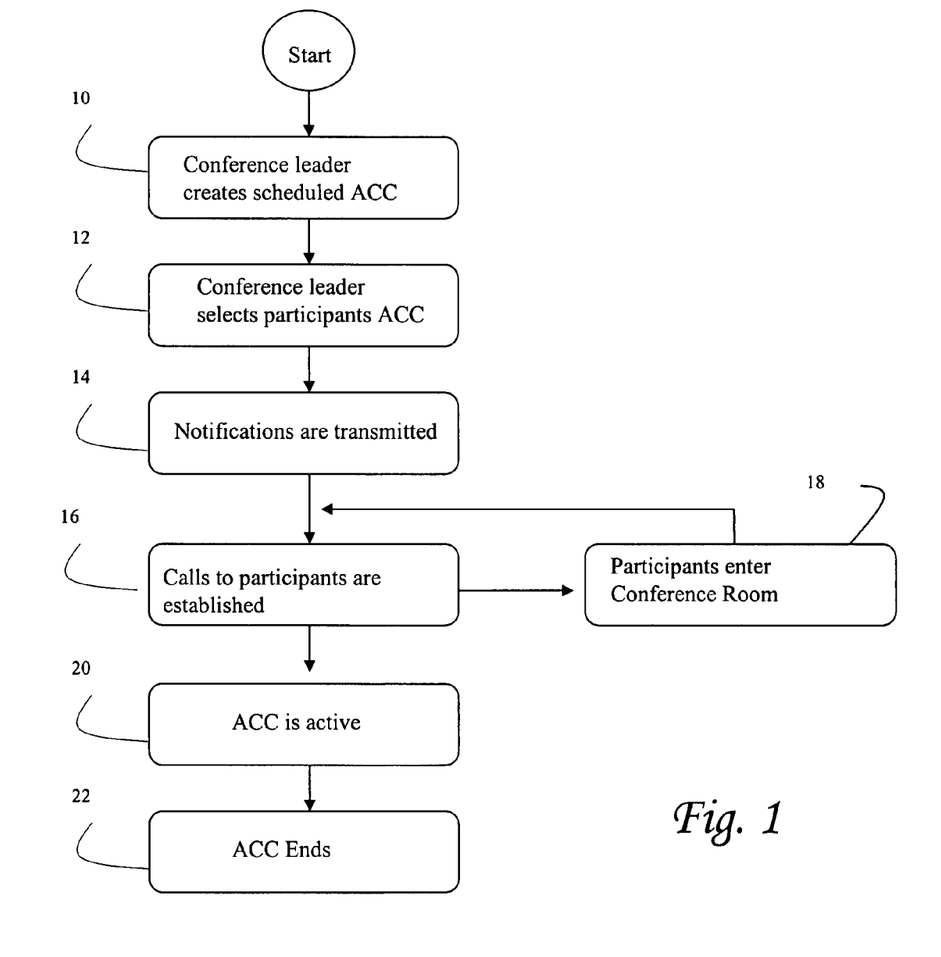
FIG. 1 disclose one embodiment of the steps occurring during an audio conference.

One embodiment of the process of initiating, conducting, and terminating the ACC is depicted in FIG. 1. FIG. 1 illustrates, at a high level, some of the phases associated with using the multi-media audio conferencing service.

The process begins when the conference leader schedules the ACC 10. This may be accomplished by the leader logging onto a web-site using a personal computer and interacting with a menu for scheduling the call. Alternatively, other access methods can be used, such as voice recognition using a telephone access or the leader talking with a customer service representative to establish the call. In some manner, the leader indicates or selects participants 12 involved in the call. Various techniques can be used for accomplishing this step ranging from typing in the telephone numbers of the participants to selecting names from a contact list where the names are associated with telephone numbers. Other forms of identifying participants may involve selecting email addresses, which are then mapped to a participant's telephone contact information.

In this embodiment, the system sends notifications 14 to the participants of the scheduled call. Various means of communicating with the participant are defined, which can be different and tailored for each participant. Various details regarding the ACC are typically conveyed to the participant via the notification. The notification process can also be interactive with the participant, requiring them to respond, confirm, or modify the information.

Next, the system establishes calls to each of the participants 16. In this embodiment, calls are made to the participants by the system, although in other embodiments, the participants can call into a bridge of the system, or a combination (e.g., some participants being called and bridged on, while others call in and are bridged on). As the participants answer the call, they may simultaneously enter a virtual web-based 'conference room' 18. The virtual conference room allows participants to wait for the conference leader to join. In this state, participants may hear music, or may communicate with each other, or may be isolated.

Once the leader has joined, or by explicitly commanding so, the ACC is considered as being active 20 and the participants in the conference room are joined into the call. Various multi-media capabilities are defined allowing communication between the leader and participants. Finally, when the ACC leader chooses to end the call, the ACC is terminated 22. Typically, any participants in the conference room are disconnected.

A. Illustrative Embodiment

A specific embodiment of the ACC system is illustrated by detailing in chronological order events that may occur when using the system. This represents only one embodiment, and does not illustrate all possible capabilities of the system.

In this embodiment, the manager of a business enterprise desires to a have a conference call with various project team members to discuss a particular project. The manager is the leader of the ACC and the team members are the participants. All are located in different physical locations. At least some of the participants have a personal computer or similar device (e.g., mobile phone, PDA, etc.) with Internet access.

The manager logs onto the web server using a URL and selects an option to create a scheduled ACC. The manager indicates the participants by opening a contact application program (such as an address book) and selecting (via 'dragging and dropping') various names into the participant list. The system confirms that the manager desires to send out invitations to the participant as well as subsequent reminders for the call. The manager may also provide various other information regarding the time, nature, name, duration, etc. of the ACC that is to be included in the notification. Various mechanisms for indicating the times and durations are possible.

The system sends out notifications to the participant list using the contact information provided by the leader. The system may expect a response from each participant as to whether they can participate, collects the answers and associates the answer with each requested participant, and informs the leader of the results. The system may send an email to the leader indicating that all participants can participate. The leader may confirm that the call should continue as scheduled. If the leader does not confirm, the leader can cancel the call (e.g., if a key participant is unable to participate).

Shortly before the time of the call, the system sends a reminder to the participants of the call, and provides a hyperlink where they can log into a website to enter a virtual web-based 'conference room' associated with the call. The web-based virtual conference room tracks and corresponds to, the state of the audio conference call. At the designated time, the system initiates audio calls to the participants using the indicated contact information. As each participant answers, the system updates a list of participants on the conference room page who are connected, so that the manager (and potentially the participants who have access to the conference room page) knows who has joined the call and their status.

After all participants have joined, the leader can 'lock' the conference to exclude further members from joining. The leader can do so by indicating such on the web site (targeting the virtual conference room) which correspondingly controls the switching system of the ACC. Alternatively, the system may automatically lock the conference if all the indicated participants are present.

During the call, the leader can elect, using the web-interface, to selectively mute certain participants. This feature is particularly useful for eliminating background noise for participants whose phone lacks a 'mute' button, and may not be aware that background noise at their location is being broadcast over the conference bridge. The leader may also elect to drop a participant (e.g., release them from the call) if their presence is not needed. The status of each of the participants is indicated to the leader to view on the web page, so there is no question as to whether a given participant is present. This feature can be useful for the leader to know if a participant on a mobile phone has been dropped. Further, during the call, the leader may send messages to the website, which the system then converts to email and sends to the participants. Alternatively, the web sit may post the information on the conference room web page, allowing other participants to view the same information. The leader may control whether each participant can view the page.

At the end of the call, the leader can terminate the call, and the system will record the call and various call details in a log. This allows the leader to review past calls, and determine when they occurred, how long they were, who were the participants, and what messages were sent or posted on the web page. It is also possible that a record of the audio call can be kept, if desired, via the log. Other information may be recorded (such a resources used), and the manager may receive an email message reporting the same.

Each of the above stages are now discussed further in-depth

B. Scheduling the ACC

The leader is typically the user requesting establishing the ACC. Establishing the ACC involves scheduling the ACC for a given start time, and/or duration. Two basic types are possible—one is 'on-demand' and the other is 'scheduled.' On-demand is an immediate request for creating an ACC whereas a scheduled ACC call is one that us requested for creation in the future (e.g., in a few hours or few days). Depending on which one is selected, different options are possible.

Various mechanisms are defined allowing the leader to establish and control the ACC. One common interface is a web-based interface, and allows the leader to select participants by individually entering or copy information manually or by referencing stored contact information. One form of copying information includes using information from a previously stored contact list (such as that maintained by various well-known name and contact information organizers) or selecting individuals from an organization chart. The indication of participants for a call can be done by a procedures known as 'drag-and-drop' in which a name or other participant identifier is selected by the leader from an contact list, and deposited into the name into a list of ACC participants by the well known 'drag and drop' man-machine interface technique. This embodiment has the advantage that it allows the IACS to use any other information available in the contact list for that participant. For example, an email address of the participant can be useful to the system for sending a link to the conference room. Thus, the participant can receive an email message with a link to enter the conference room. If the address book contains a photo of the person in the contact list, the system may use the photo image along with the contacts name in conjunction with managing an active call. This feature will be useful in the context of the 'conference room' described subsequently. It allows users to associate a face with the participant's connection to the call.

For participants that are not in the contact list, the leader can manually enter in the appropriate information, such as name, telephone number, etc. In some embodiments, entering the information manually results in the IACS automatically populating the information into the contact list.

Once the associated information for each of the participants is provided, the IACS can determine the resources needed to establish the ACC, such as the number of ports. The user may also indicate whether the call is for on-demand establishment or scheduled establishment. On-demand establishment reflects an immediate request for establishment of the ACC by the leader, whereas the scheduled establishment requests establishment at an indicated time. In such cases, the leader may request to be called prior to the conference, or may initiate the process by calling into the system within a certain time window.

The system selects a telephone number, typically from a pool of available telephone numbers, identifying the conference bridge associated with the call. The system provides the leader with the bridge number, and typically also provides verification and/or authorization data in the form of a passcode and/or personal identification number (PIN) as well. The pass code is typically used for each caller to gain access to the conference, whereas entering the PIN in addition to the passcode identifies the leader. As with typical telephone conferencing, the user enters this information using touch tones from their telephone after they have dialed the conference bridge number. Other embodiments could use speech recognition.

Other interfaces may be used by a leader to interact with IACS, such as Instant Messaging (IM) or Short Message Service (SMS). In some cases, such as SMS, the requests are typically initiated from a mobile device, and the instructions may be simpler or more limited in capability (though this is not required). For example, a user interacting with SMS may initiate a previously scheduled call within a certain time window with a single command. This allows a leader to schedule the call using a personal computer and initiate the call at a mobile phone while on the road, without requiring complex interaction. The user may send a simple command, referencing the scheduled call, in order to initiate it. Alternatively, the system could call the leader on a mobile phone after sending a text message to the leader regarding the nature of the call.

A leader may subscribe to the IAC service and define a profile for various settings. For example, setting could be defined allowing a leader to prohibit any participant for viewing the web page, or controls participant's selective control capability, etc. The leader may administer and alter these parameters via the same website used to reserve resources for the ACC. Such an capability would typically be accessed via a menu labeled "User Options/Service Administration."

C. Sending Invitations/Reminders

The IACS may communicate an invitation pertaining to the ACC to the identified participants. For on-demand ACC establishment, the invitation is a present offer for the participant to accept and join the conference. For scheduled ACC establishment, the invitation is an offer to join a future ACC. In this case, the participant may be requested to respond whether they intend to participate. In other embodiments, the invitation is for information-only purposes and no reply is required for subsequent participation.

The sending of the invitation may occur using the various communication means. A common embodiment is using an e-mail address and sending a text-based message. Instant Messaging (IM), Short Messaging Service (SMS), or even an audio message (including depositing an audio message in a participant's voice mail box) are all possible messaging techniques.

Similar to an invitation, a reminder may be sent out to the participants just prior to the beginning of the ACC (at default or otherwise indicated time intervals, such as two minutes before the call). The IAC system may transmit one or more reminders to the participants (as well as to the leader). The sending of reminders is only used for scheduled ACC establishment (since an on-demand ACC is requested immediately). Although reminder messages are typically informational, the participant may be prompted to provide information regarding whether they intend to participate (e.g., confirming their ability to participate). Replies can be optional (e.g., not impacting a participants ability to subsequently participate in the ACC), or replies can be required (e.g., failure to reply precludes their ability to subsequently participate).

One embodiment of an invitation message requiring action by the recipient may occur when the IAC system sends an invitation that includes a hyperlink in which the recipient can select, and then view, various options associated with the specific referenced ACC. Thus, the recipient could then select to join, affirm their planned future participation, or otherwise provide information as requested (e.g., an alternative telephone number they can be reached at). In addition, the hyperlink could provide the recipient with immediate access to the 'conference room' (discussed below).

In other embodiments, the participants are sent invitations/reminders with an option of responding by replying to the message. The contents of the reply message is read by the IAC system to determine what action is appropriate for that participant. Typically, the reply message requires selection of a particular option or use of certain keywords.

D. "Conference Room"

The conference room is a virtual web based waiting room allows participants to 'wait' prior to the starting of a conference call as well as use during the call. It provides a mechanism to convey information to the participants as well as messages from the leader to the participant using a communication medium separate from the voice channel. The conference room can also reflect the status of the call. The conference room is a web page, which exists in conjunction with an audio conference call. Typically, it exists prior to a call, allowing users to log into it prior to a call, as well as during a call. In some cases, a 'participant' which is not able to participate via a call, may participate via the conference room. In alternative embodiments, the audio portion of the call may be streamed from the web-page to the participant. After the conference call is terminated, the conference room is typically not available, since there is no call for it to be associated with.

The above web page is also used to convey ACC management information as well as information between the users. Typically, the web page is segregated into windows where each window is associated with a particular function. For example, information only seen by the leader may be segregated from information that is seen by the leaders and the participants. Because this can be customized in various embodiments, there is no hard and fast delimitation of the information that comprises the 'conference room' versus other types of information.

The conference room allows the participants and leader to view information about the conference call, including any identifying information provided by the leader (e.g., the 'name' or purpose of the call), a list of participants, and any other contract information provided by the leader (e.g., name, title, location, phone number) of each participant. In some embodiments, the leader may provide contact and photo information regarding the participants. As participants enter the conference room, a status indication can be provided indicating that they are now present. Status information may be provided (e.g., as to whether they are muted or present). The amount and type of information presented to the participants can be limited by the leader or by the service provider.

In other embodiments, a portion of the web page can be used to display figures, text, or other information to facilitate discussion on the ACC. Thus, the conference room can also be a virtual bulletin board for the leader to send messages, indicate conference note, actions items, etc. The leader may also post images, figures, text, etc for viewing on the web page. The leader may also be able to control a cursor, and select from multiple figures for presentation to the participants.

II. System Architecture

Figure 2:
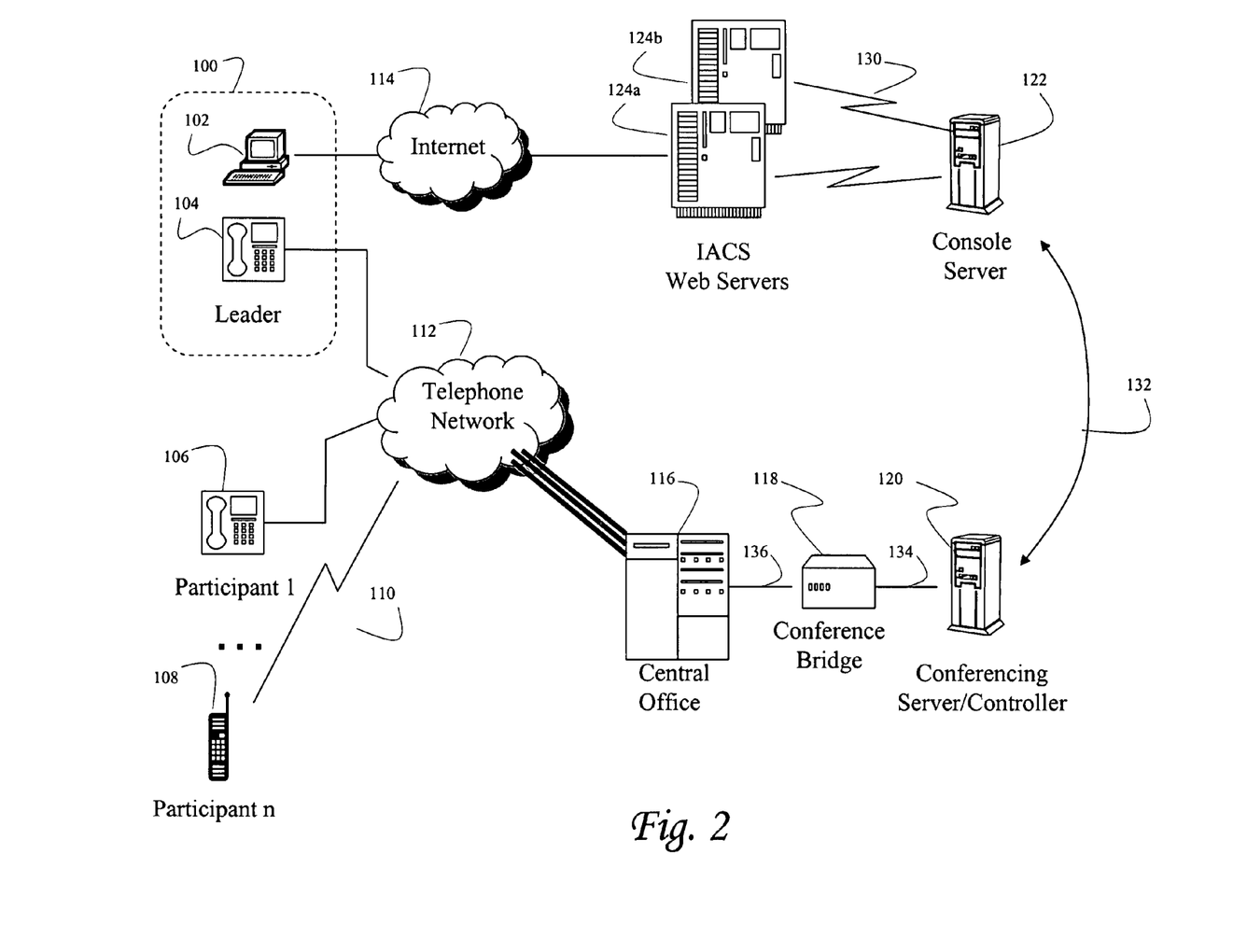
FIG. 2 discloses one embodiment of the various components used to provide multi-media control of audio conferencing.

One embodiment of the system architecture for providing the aforementioned services is illustrated in FIG. 2. Various deployment and implementation alternatives exist and thus variations of the architecture in FIG. 2 are possible, as is well known.

The users of the IACS system can be divided into a leader and one or more participants. The ACC call leader is represented as being in a location 100 with ready access to a telephone 104 for the audio conference as well as a computer 102 for receiving ACC management information. The computer 102 provides the means for the leader to send or receive information about the ACC, either before, during, or even after the ACC. The leader can also send information to the IACS which in turn broadcasts the information or otherwise posts it on the website allowing the other participant to view the messages.

In this embodiment, the leader's computer is connected to a data network 114 (such as the Internet) using any of the techniques well known for accessing data networks. The leader may access a website hosted by an IAC web server system 124, or otherwise be in communication therewith. In some embodiments, there may be a single web server 124a while other embodiments multiple additional servers 124b may be used for reliability, scalability, or other reasons. For example, a large telephone network provider offering integrated ACC service may deploy multiple web servers for different geographic regions.

The web servers provide a graphical user interface allowing the leader to easily establish and manage the ACC. Examples of graphical user interfaces are discussed subsequently in conjunction with FIGS. 3a-3c. The web servers communicate, for example, using a TCP/IP communication protocol 130 over an internal network (not shown) with a console server 122. Typically, the console server 122 communicates with the conferencing server 120 over a communications link 132 over a virtual private network, a TCP/IP communications connection, or other means (as is well known).

In the preferred embodiment, the console server isolates the web servers from the protocol specifics associated with the conferencing server/controller 120. Further, the web servers are largely unaware of the particular deployment architecture of where the conference bridges 118 and where the associated conferencing server/controller 120 is located. Thus, there may be a plurality of conferencing controllers that have different protocols with which a particular web server is associated with via the console server. Also, the console server 122 is programmed with the application layer information and storing information about the participants. The console server 122 (in some embodiments) stores the main service logic and associated data for the IAC service. The web servers act as an interface for receiving and passing information with the ACC leader, but the application logic is contained, along with related data, in the console server. Thus, if a user has stored a request for a future ACC, that information for the call, including the leader and the participant information, is stored in the console server, which is executing the application. When the appropriate time comes for initiating the call, the console server then instructs the conferencing server to initiate the calls.

The appropriate control commands are received at the conferencing server/controller 120. The conferencing server/controller may implement an API 132 allowing commands to be received and responses to be provided. Should there be different manufacturers of the conferencing server/controller with different API interfaces, any implementation differences are isolated from the web servers via the console server.

In other embodiments, it is possible that the web servers 124 communicate directly with the conferencing server 120, or that the console server functionality is integrated into the same computer hosting the website. Thus, in one embodiment, the web server 124 and the console server 122 could be viewed as two logical applications that are residing on the same computing system.

The conferencing server 120 controls and manages the conference bridge 118. The conferencing bridge 118 is the network resource that actually bridges the calls between the leader and participants. It also provides messages indicating the various status indications to the conferencing server 120 over interface 134. The conference bridge interfaces using various trunks 136 with the central office 116, which interfaces (or can be considered part of) the telephone network 112.

The conference bridge receives commands from the conferencing server/controller 120 using an API 134 for various actions associated with controlling the ACC. For example, when an ACC is initiated, the conferencing server receives the instruction to establish a call to a directed telephone number, and controls the conference bridge to accomplish that result. Typically, the commands include instructions for initiating a call to a specific destination, place the call on hold, and move the call from hold onto a bridge. The conference bridge then interacts with the central office to establish the actual individual calls.

The central office is connected to the telephone network using various trunks, and other communication arrangements that are well known. The telephone network 112 in turn, is connected to the various participant's 106, 108 telephones. Participants may use wireline phones 106 or wireless (mobile) phones accessing the telephone network via radio access 110. Some of the user's phones may have integrated data network access, so that the same device may be used for the ACC as well as interacting with the website. Other access means, such as wireless or voice over IP (VoIP) can be readily accommodated.

Although the participants are not illustrated as having a computer readily available, often one is available, particularly in a business environment. Participants may access the IACS web servers using computers and receive real-time information regarding the ACC, such as notifications/indications of current participants and ACC status. While a participant's access to a non-audio communication means is not required for a participant to be involved in the call, in many cases the use of a computer for access a website enhances the utility of the service.

The physical location of the various components can be varied. All of the IACS components (e.g., web server, console server, conferencing server/controller, and bridge) could be co-located in a single location. However, in many deployments, the servers could be physically dispersed allowing a wider geographical area to be served. Although there may be a preference to locate conference bridges and the conferencing controllers in a common location with a central office, this is not required.

III. User Interface

Several embodiments of the user-interface associated are possible for the leader and the participant. Typically, the leader is offered more control capabilities, and thus a GUI based web page is used by the leader to control the conference as well as embody the conference room. However, other embodiments are not precluded, such as using a touch tone interface or a message based interface for controlling the conference.

Figure 3A:
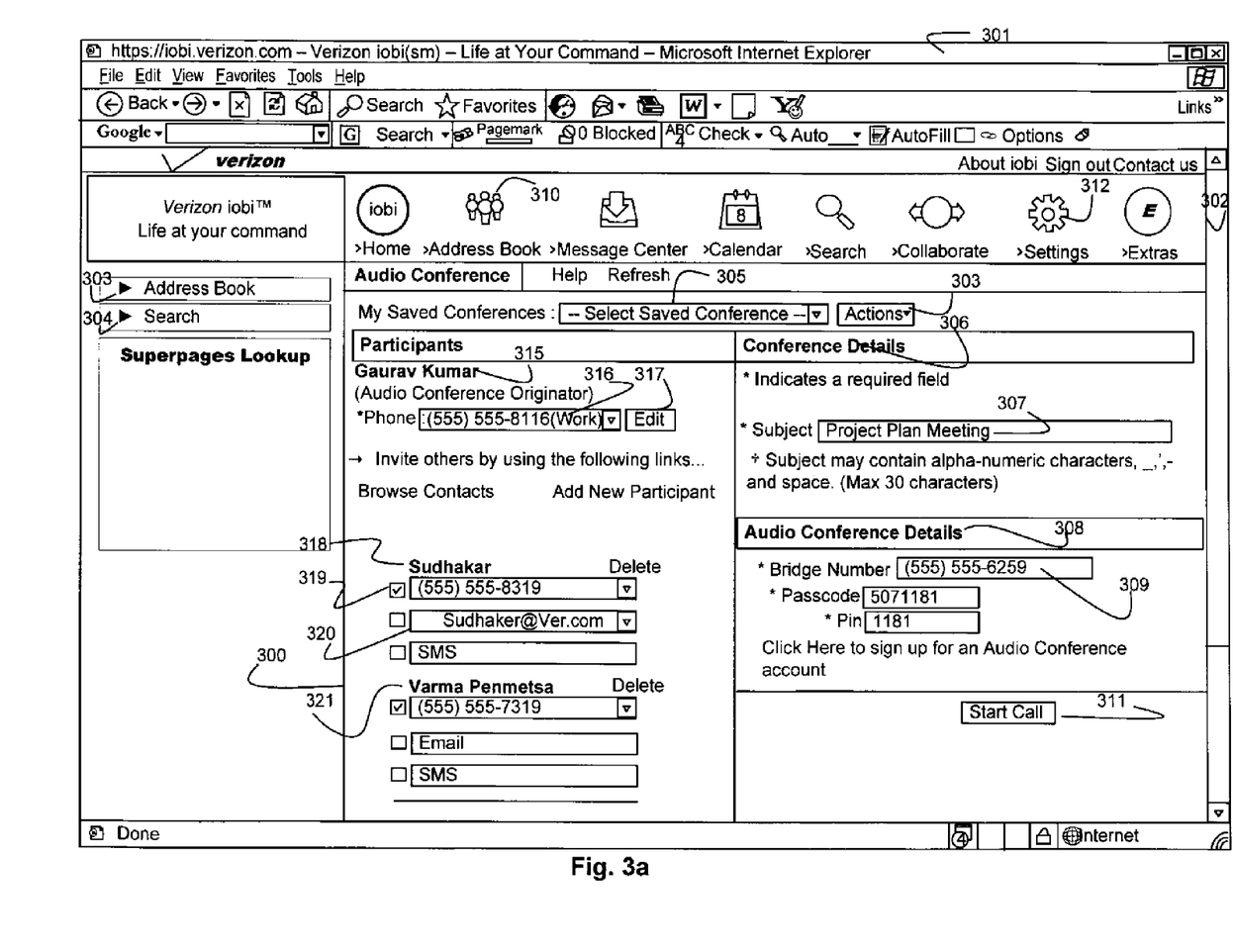
FIGS. 3a-3c disclose one embodiment of the user-interface used in conjunction with managing an audio conference call.

In FIG. 3*a*, a screen 301 is displayed for establishing the ACC. The screen 301 may be implemented, for example, as a web page. The screen 301 typically has various windows associated with the service. For example, window 302 provides various functions which the leader can invoke. These typically are represented via icons, and some may pertain to other services, which others may pertain specifically to the ACC service, while others may have a dual role. For example, the address book icon 310 can be used to organize names and addresses separately from the IAC service, but which can also be used to identify participants for the IAC service. Similarly, the settings icon 312 can be used to set settings for user preferences for the ACC service as well as other services.

The screen 301 displays information pertaining to a conference call, such as who was involved, notes entered, etc, and permits the user to edit such information for storage. The collective information for a call can be retrieved via a pull down menu 305. A function key 303 allows review, editing, or other functions to be invoked. For example, a previous conference call involving a set of participants may be copied to define the set of participants for a current call.

The originator or leader of the call is indicated by name 315, as well as their current phone number 316. A function key 317 allows the leader to edit the value, if necessary. Thus, if the leader knows they will be at a different number for a call, they can alter the telephone number value, which may have defaulted to a regularly used telephone number.

Participants are also indicated in window 300. In this embodiment, "Sudhakar" 318 is one participant, with the telephone number 319 indicated where he can be reached. An email address 320 may also be noted, which can be used to send out the notification/reminders. A preferred number or alternative telephone number can be selected or typed in by the leader. Alternatively, the contact information may be obtained by looking up the participant in an address book by selecting the appropriate icon 303 or 310. The name can be 'dragged and dropped' for convenience. A second participant, "Varma", 321 is also indicated with a phone number.

Another window area contains details pertaining to the conference call 306. In this window pane, there is a subject or name associated with the call 307, and audio call detail 308 which include telephone number, pass code, and PIN values 309. Finally, the "start call" 311 function allows the call to be manually instituted. Other embodiments could have the system automatically call the participants at the scheduled time.

Figure 3B:
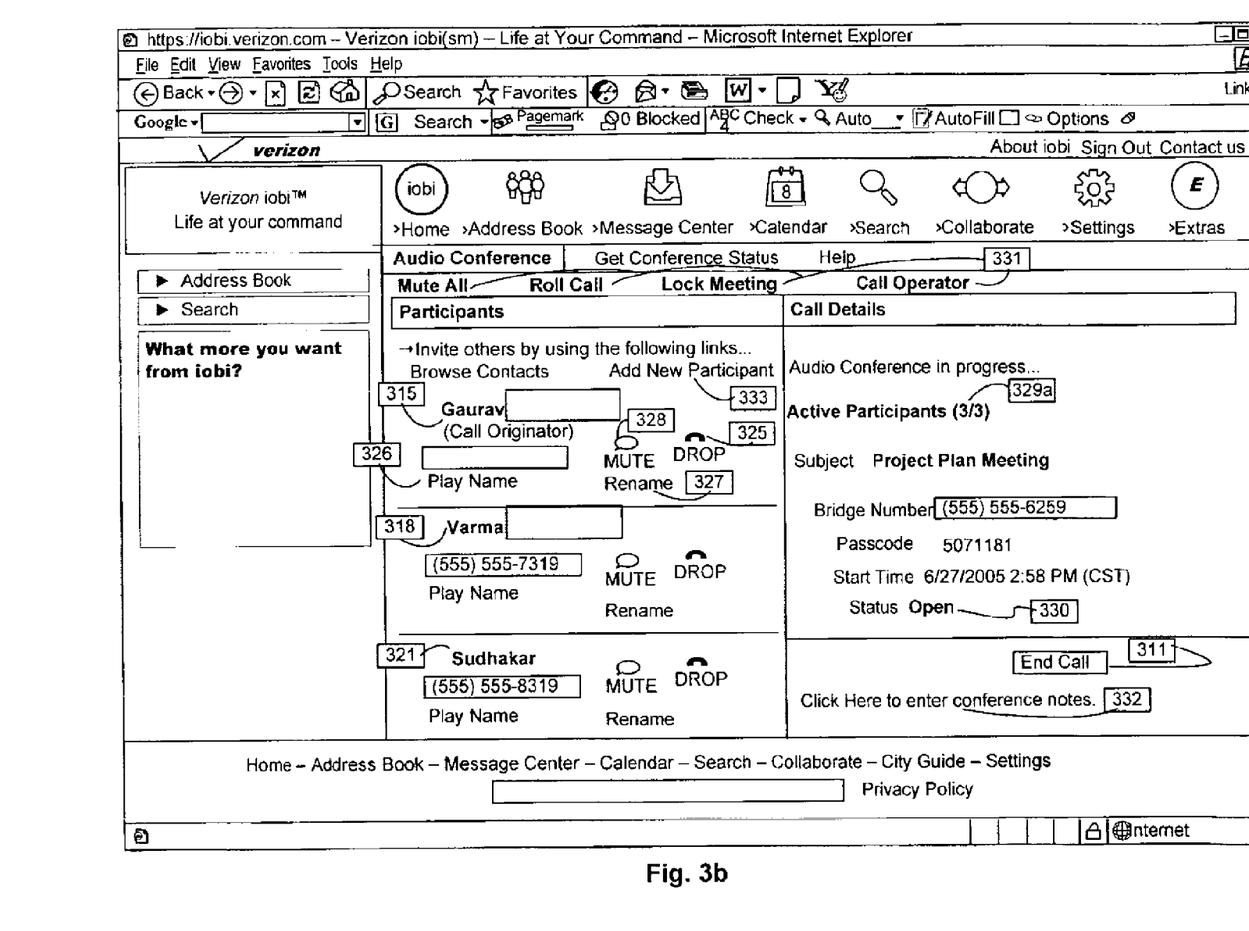

FIG. 3*b* illustrates one embodiment of the screen 301 when the call has commenced. In this embodiment, a function bar 331 has appeared, allowing various control functions to be invoked by the leader. Similar function bars could be provided to the participants. In this embodiment, the leader can "mute all" which involves suspending each party's ability to generate sounds. The leader can also institute a "roll call", which results in the system announcing each party's name (which was previously recorded as the party joined the call). The leader can also "lock" the call, preventing further participants from joining the call. Finally, the leader can call an operator (associated with the service provided) to provide help. The operator can be bridged into the call to provide assistance.

If the leader wants to manually initiate a roll call for each caller, a specific function key 326 can be invoked for announcing the participant's name. Other icons are provided to the leader, indicating status of the participants and the call. For example, the leader can selectively mute 328 a participant or ascertain their status 325 as to whether they are still on the call (or have dropped out from the call). In addition, each of the participant's name appears 321 with their telephone number and status information. Although participant photo information is not shown, other embodiments may incorporate it by displaying a thumbnail sized image associated with a name.

The status of the call 329*a* reflects that three of three originally invited participants are on the call, and a status indicator 330 indicates the call is open (e.g., active and/or open to further participants). A function key 311 allows the leader to terminate the call, and a notes area 332 allows the leader to type notes for future reference.

Figure 3C:
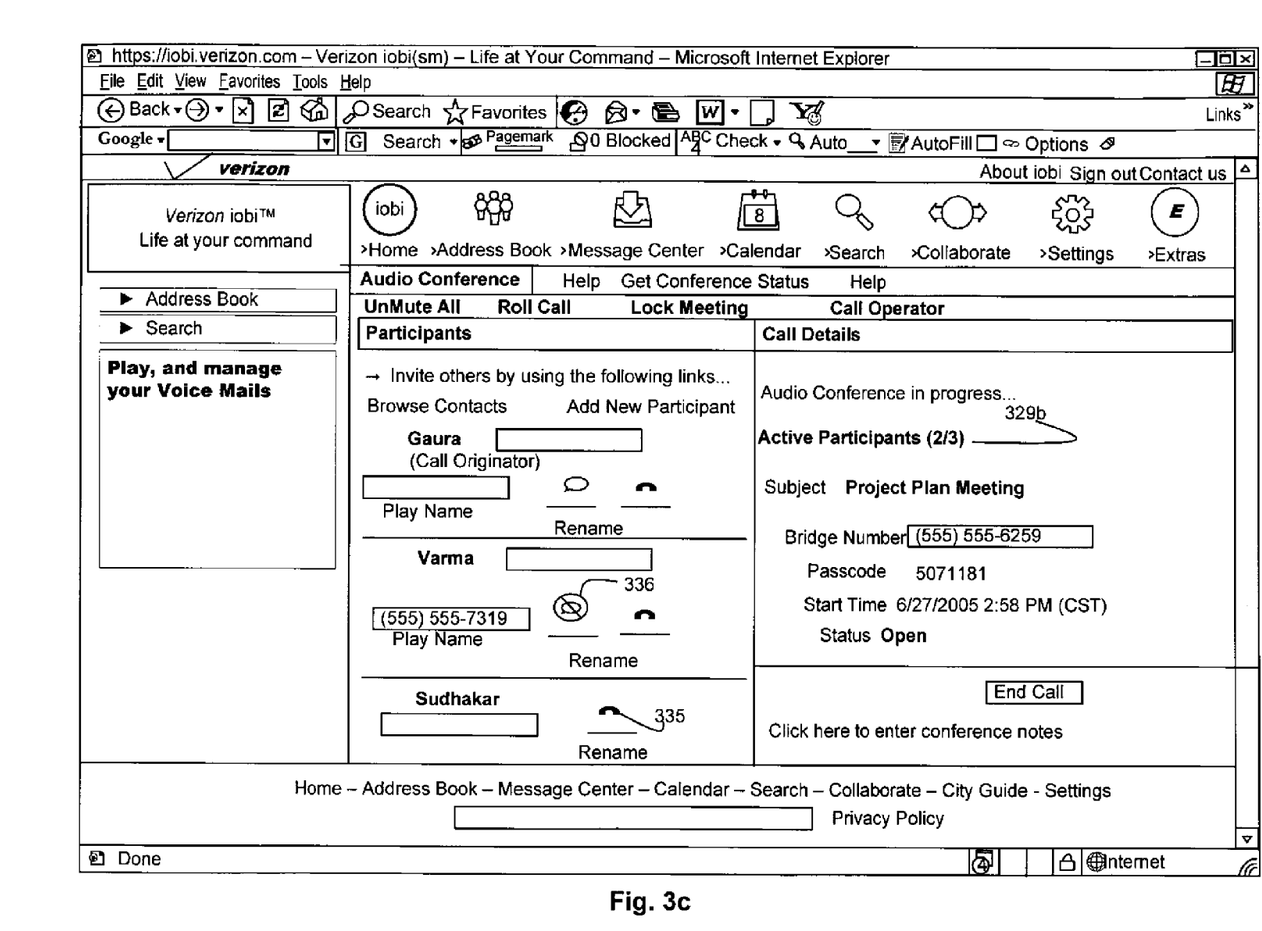

Finally, FIG. 3*c* illustrates a web page in which one of the participants has dropped off the call. In this case, the icon 335 reflects they are no longer on the call. Another icon 336 indicates the "mute" status for the other remaining participant. Similarly, the call status indicator 329*b*, reflects that only two of the three participants are present.

Using the above system, the use of an audio conference call is greatly enhanced with respect to functionality and usability. The participants could be presented with similar, identical, or different web pages, or with none at all. While the above discloses only one embodiment, variations are readily evident to those skilled in the art of multi-media telecom services.

Many modifications to the preferred embodiments set forth herein, or other embodiments, are possible in light of the teachings presented in the foregoing descriptions and the associated drawings. Therefore, it is to be understood that the inventions as claimed are not to be limited to the specific embodiments described herein, and that modifications and other embodiments are intended to be included within the scope of the appended claims. Although specific terms are That which is claimed:

1. A method comprising:
providing a user interface hosted by a computer configured to receive a request from a first user for establishment of an audio conference call, the user interface configured to receive a plurality of participant information from the first user, the participant information including audio contact information for each one of the participants;
transmitting an electronic notification message from the computer to the first user and to at least one of the participants indicating the audio conference call;
transmitting a command from the computer to a conference bridge controller to establish an audio telephone call to a phone device associated with the first user that is separate from the computer and to a phone device associated with the at least one of the participants that is separate from the computer, based at least in part on a response to the electronic notification message provided by the at least one of the participants;
receiving an indication at the computer from the conference bridge controller that the audio telephone call to the first user and to the at least one of the participants is answered; and
providing an indication on the user interface to the first user and to the at least one of the participants of the real-time status of each participant of the audio telephone call wherein the real-time status of each participant is controlled at least in part by the first user, wherein the first user has control capabilities comprising locking the audio telephone call, selectively muting one or more participants and selectively disconnecting one or more participants;
wherein the first user communicates informational data via the user interface to one or more of the participants during the audio telephone call wherein the first user controls the informational data viewable by each of the one or more participants, wherein the informational data includes at least one of figures, text, or images provided by the first user.

2. The method of claim 1 wherein the electronic notification message transmitted from the computer to the at least one of the participants is an email message indicating a time for the audio conference call and a request for a response from the at least one of the participants.

3. The method of claim 2 wherein the participant information comprises an email address associated with the at least one of the participants, the email address used in conjunction with the email message transmitted to the at least one of the participants.

4. The method of claim 1 wherein the first user provides the participant information by selecting a name from an electronic address book application program.

5. The method of claim 1 further comprising:
providing a disconnect command by the first user to the user interface to disconnect a selected participant from the audio conference call;
transmitting a call disconnect command to the conference bridge controller identifying the selected participant;
disconnecting the selected participant from the conference bridge controller;
receiving a second indication at the computer from the conference bridge controller that the selected participant is disconnected; and
displaying on the user interface to the first user a disconnected status associated with the selected participant.

6. The method of claim 2 further comprising:
receiving an electronic response message from the at least one of the participants sent in response to receipt of the electronic notification message, the electronic response message confirming participation in the audio conference call.

7. The method of claim 1 further comprising:
storing the participant information in the computer along with an audio conference call identifier associated with the audio conference call;
receiving text input from the first user related to the audio conference call;
storing the text input in association with the audio conference call identifier; and
receiving a request from the first user for retrieval and presentation on the user interface of the text input along with the identifier associated with the audio conference call after the audio conference call has terminated.

8. The method of claim 1 wherein the status of the audio telephone call to the at least one of the participants indicates in real-time whether the one of the participants is currently connected to the audio conference call.

9. The method of claim 1 wherein the informational data communicated to each of the one or more participants via the user interface during the audio telephone call further includes notes of the audio conference call and/or action items from the audio conference call.

10. A method comprising:
receiving a request for establishment of an audio conference call from a first user by a website, the request comprising a time associated with an initiation of the audio conference call;
receiving a plurality of participant information from the first user by the website, the plurality of participant information comprising a telephone number for each participants;
receiving a first command from the computer to proceed with the audio conference call;
transmitting a second command to a bridge controller to establish a plurality of telephone calls to a phone device associated with the first user that is separate from the computer and to a phone device associated with each one of the participants that is separate from the computer, based at least in part on a response message to a notification message provided by each one of the participants;
providing a real-time status indication for the each one of the participants to the first user and to each participant, the real-time status indicating whether or not each one of the participants is active on the audio conference call, wherein the first user has control capabilities comprising locking the audio telephone call, selectively muting one or more participants and selectively disconnecting one or more participants;
communicating informational data from the first user to one or more of the participants via the website during the audio telephone call wherein the first user controls the informational data viewable by each of the one or more participants, wherein the informational data includes at least one of figures, text, or images provided by the first user; and
conferencing a second telephone call associated with the first user with the plurality of telephone calls to each one of the participants and the first user on a conference bridge.

11. The method of claim 9 wherein the plurality of participant information comprises an email address for each one of the participants.

12. The method of claim 10 further comprising:
selecting a conference bridge telephone number associated with the audio conference call;
indicating the conference bridge telephone number to the first user; and
transmitting the conference bridge telephone number to each one of the participants in the notification message addressed using the email address to the one of the participants.

13. The method of claim 12 wherein the notification message comprises the time associated with the audio conference call.

14. The method of claim 12 wherein each one of the participants responds to the notification message with the response message comprising an alternate telephone number for establishing the telephone call to each one of the participants for the audio conference call.

15. The method of claim 12 wherein the notification message comprises a link identifying the website.

16. A system comprising:
a computer hosting a website providing access to a first user for initiating an audio conference call wherein the computer receives a request for an audio conference call and contact information for a plurality of participants;
a conference controller receiving a first command from the computer, the first command instructing the conference controller to initiate calls to a phone device associated with the first user that is separate from the computer and to a phone device associated with one of the plurality of participants that is separate from the computer, the conference controller transmitting a second command in response to receiving the first command, the conference controller providing a real-time status indication after receiving an indication of completion of the calls to the first user and to one of the plurality of participants; wherein the first user has control capabilities comprising locking the audio telephone call, selectively muting one or more participants and selectively disconnecting one or more participants; and
a conference bridge operatively connected to the conference controller configured to receive the second command, the conference bridge initiating the calls to the first user and to one of the plurality of participants, the conference bridge providing the indication of completion of the call to the conferencing controller after completing the call to the one of the plurality of participants of the audio conference call;
wherein the first user communicates informational data via the website to one or more of the plurality of participants during the audio telephone call wherein the first user controls the informational data viewable by each of the one or more participants, wherein the informational data includes at least one of figures, text, or images provided by the first user.

17. The system of claim 16, wherein the first user is associated with a mobile device, said mobile device configured to receive a status message from the conference controller associated with one of the plurality of participants and provides to the first user a status indication associated with the one of the participants on the audio conference call.

18. The system of claim 16 further comprising a console server receiving the first command from a mobile device associated with the first user and generating a third command to the conference controller, the console server further retaining data associated with the audio conference call including the contact information for one of the plurality of participants.

19. The system of claim 16 wherein the website is accessible to the one of the plurality of participants.

20. The system of claim 18 wherein the console server is configured to generate an electronic notification message to one of the plurality of participants prior to the occurrence of the audio conference call, the electronic notification message comprising data associated with the audio conference call.

21. The system of claim 20 wherein the data associated with the audio conference call comprises a date and time associated with the audio conference call, and a conference bridge number.

22. The system of claim 20 wherein the electronic notification message is sent as an email message.

23. The system of claim 16, wherein the first user is associated with a mobile device, said mobile device receives an audio call control management command from the first user, the mobile device associated with the first user generating in response a message to the conferencing server terminating the call to the one of the plurality of participants in the audio conference call.

24. The system of claim 18 wherein the console server stores data associated with the date and start time of the audio conference call, and identifying information for each participant on the audio conference call.

* * * * *

UNITED STATES PATENT AND TRADEMARK OFFICE
CERTIFICATE OF CORRECTION

Page 1 of 1

PATENT NO. : 8,611,521 B2
APPLICATION NO. : 11/482403
DATED : December 17, 2013
INVENTOR(S) : Raul Aldrey et al.

It is certified that error appears in the above-identified patent and that said Letters Patent is hereby corrected as shown below:

On the Title Page

Under item (75) listing of inventors, please replace the whole listing with the following corrected listing as follows:

(75) Inventors: Raul Aldrey, Brookline, MA (US);
Diego Crespo, Boston, MA (US);
Aravind Perumandla, Woburn, MA
(US); Gaurav Kumar, Flower Mound,
TX (US); Shamik Basu, Irving, TX (US)

Signed and Sealed this
Twenty-second Day of September, 2015

Michelle K. Lee
*Director of the United States Patent and Trademark Office*